Dec. 11, 1928.

R. C. McCOLLEY 1,694,390

WINDSHIELD WIPER

Filed Nov. 28, 1927

INVENTOR,
Robert C. McColley,
By Minturn & Minturn,
Attorneys.

Patented Dec. 11, 1928.

1,694,390

UNITED STATES PATENT OFFICE.

ROBERT C. McCOLLEY, OF INDIANAPOLIS, INDIANA.

WINDSHIELD WIPER.

Application filed November 28, 1927. Serial No. 236,115.

This invention relates to means for maintaining a clear vision through windows such as the windshields or cab windows of motor cars and the like, particularly during snow and sleet storms when snow, ice or frost accumulates on the glass of such windows.

The windshield wiper heretofore employed operated perfectly in wiping off water from rains, but was entirely useless if not even detrimental when the water turned to ice or the snow stuck to the glass. My invention not only provides a wiper operating perfectly to wipe off the water but also to remove the ice and snow as it may accumulate on the glass.

The invention is described herebelow in detail with reference being made to the accompanying drawing, in which—

Figure 1:
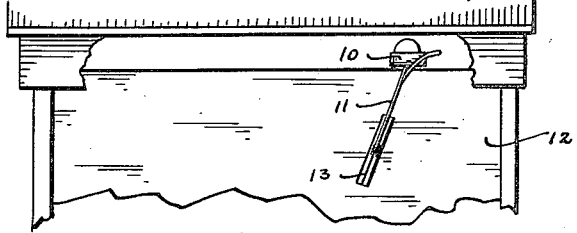
Figure 4:
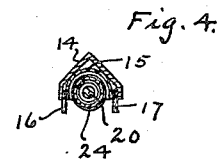
Figure 2:
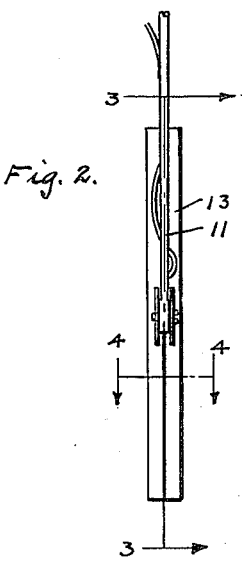
Figure 3:
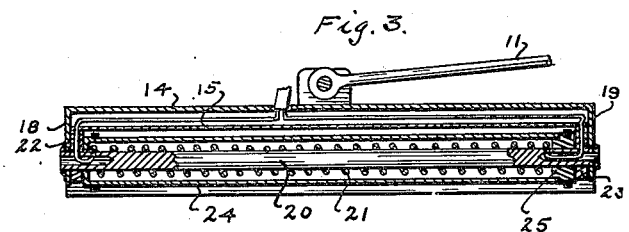
Figure 5:
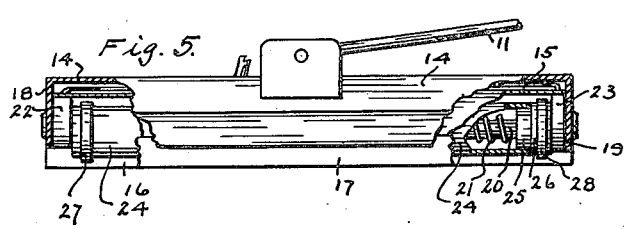
Figure 6:
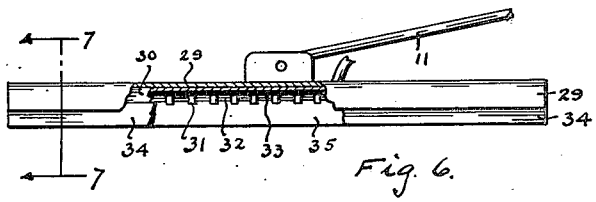
Figure 7:
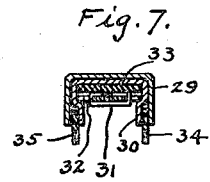
Figure 8:

Fig. 1, is a fragmentary front elevation of an automobile windshield with a windshield wiper positioned to operate thereover;

Fig. 2, a top plan view of the wiper bar;

Fig. 3, a longitudinal section on an enlarged scale through the bar on the line 3—3 in Fig. 2;

Fig. 4, a transverse section on the line 4—4 in Fig. 2;

Fig. 5, a fragmentary side elevation of the wiper bar on an enlarged scale;

Fig. 6, a fragmentary side elevation of a modified form of the bar;

Fig. 7, a transverse section through the modified form on the line 7—7 in Fig. 6; and Fig. 8, a bottom plan view of the wiper bar.

Like characters of reference indicate like parts throughout the several views in the drawing.

I employ a mechanism within the housing 10 to swing an arm 11 to and fro over the outer side of the windshield glass 12 in the usual and well known manner. A wiper bar 13 is pivotally secured to the lower end of the arm 11, which arm 11 presses the bar toward the glass as the arm swings the bar over the glass.

The bar 13 is formed by an outer housing 14 and an inner shell 15, Figs. 3, 4 and 5, and between the longitudinal edges of the housing 14 and the shell 15, on each side, are gripped the wiper rubbers 16 and 17. The housing 14 has ends 18 and 19 between which are secured a rod 20 which is held against rotation. On the rod 20 is wound a resistance wire 21 to form an electrical heating element.

The terminal ends of the wire 21 are brought out through the ends of the rod 20, up through the stationary blocks 22 and 23 to within the space between the housing 14 and shell 15, and thence outwardly through the housing, up along the arm 11 to a suitable source of electric current.

A tube 24 is slipped over the wire 21 on the rod 20 so as to be free to revolve upon the rod 20 out of contact with the wire 21. The lower end of the bar 13 swings through a greater arc than the upper end, and one end of the tube 24 is slidingly supported over the reduced section 25 of the wheel 26 which is rotatably carried on the rod 20. A rubber band 27 is fitted around the wheel 26, and a similar band 28 is fitted around the tube 24 at its end removed from the wheel.

These bands 27 and 28 contact the glass 12 through pressure from the arm 11, and serve as means for permitting the tube 24 to roll in close proximity to but without actually contacting the glass so that heat may be transferred from the heated wire 21 within to the glass.

The rubbers 16 and 17 come down and contact the glass 12 on both sides of the tube 24, serving thereby not only as wipers but also as enclosing means whereby the heat is confined therebetween and the glass.

In Figs. 6, 7, and 8, is shown a wiper bar in which two pieces of metal 29 and 30 are formed together to make a substantially U-shaped structure. The inner metal 30 is formed with a shoulder on each side to retain a heating element formed by the flat ribbon wire 31 wound about a sheet of insulating material 32, such as mica. A sheet of insulation 33 separates the wire 31 from the metal 30.

The sides of the pieces of metal 29 and 30 grip the rubbers 34 and 35 therebetween to enclose the space below the heating element. In this modified form, the distance between the heating element and the glass is determined by the pressure of the arm 11 and the resistance to flexure of the rubbers 34 and 35.

What I claim as new is:

1. In a windshield wiper, a movable bar, an electrical heating element carried by the bar, a rotatable member housing the element and wipers between which the rotatable member rotates.

2. In a windshield wiper, a movable bar, an electrical heating element carried by the bar, a rotatable member housing the element cushion means carried by the rotatable member and wipers on each side of the rotatable member.

3. In a wiper for a windshield, a movable bar, a pair of wiping members carried by the bar, an electrical heating element carried by the bar between the wiping members, a rotatable member surrounding the element, and means permitting the member to revolve in close proximity to the windshield.

4. In a wiper for a windshield, a movable bar, a pair of wiping members carried by the bar, an electrical heating element carried by the bar between the wiping members, a rotatable member about the heating element, a ring about the member spacing it from the windshield and a spacing wheel carried by the member, revolvable independently of the member.

5. In a wiper for a windshield, a movable bar, an electrical heating element carried by the bar, a rotatable member housing the heating element, and a ring about the member spacing it from the windshield.

6. In a windshield wiper, a movable bar, an electrical heating element carried by the bar, and a rotatable member housing the element and wiper rubbers extended from the bar on each side of the rotatable member forming an enclosure having a longitudinal space between them.

In testimony whereof I affix my signature.

ROBERT C. McCOLLEY.